(No Model.)
E. C. CURREY.
DRAFT EQUALIZER.
No. 370,009. Patented Sept. 13, 1887.
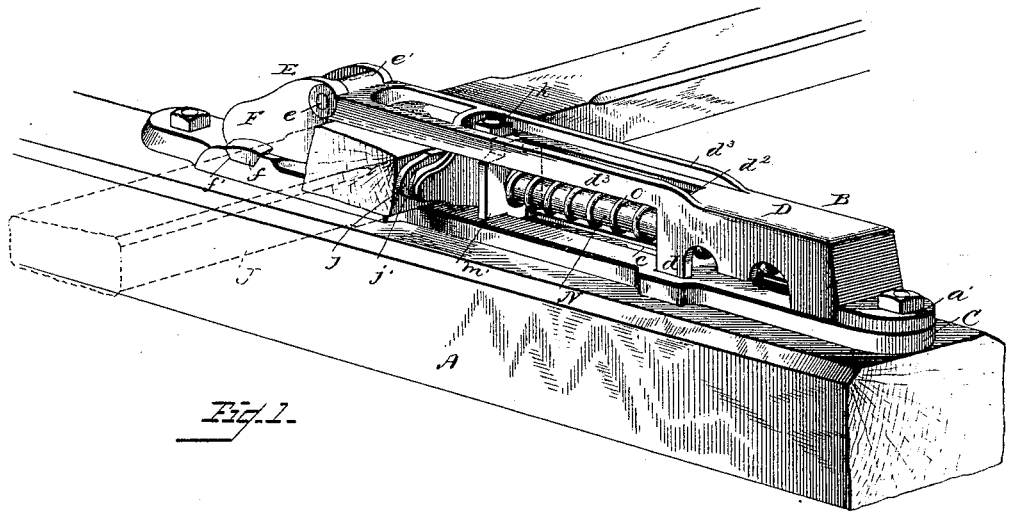
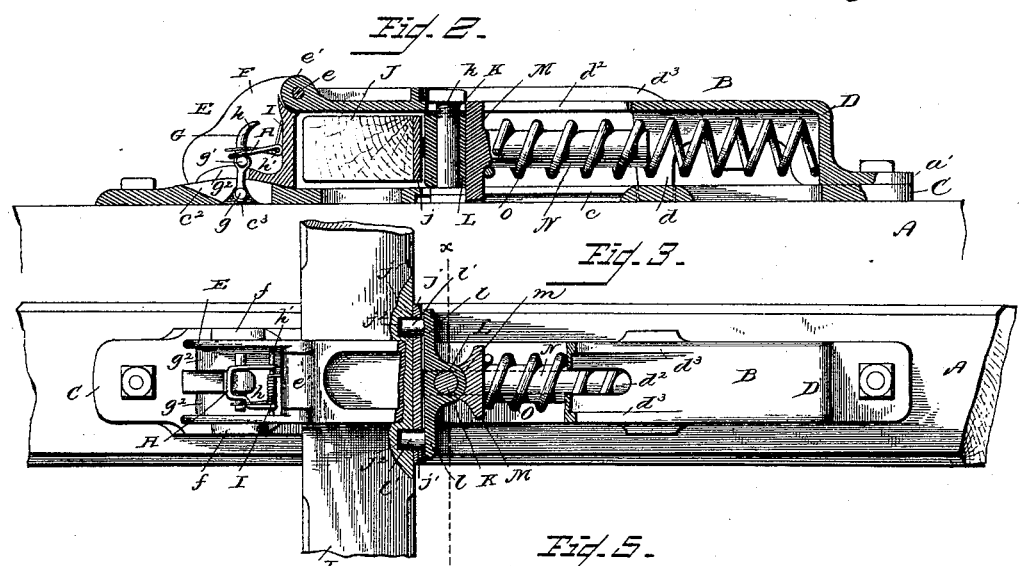
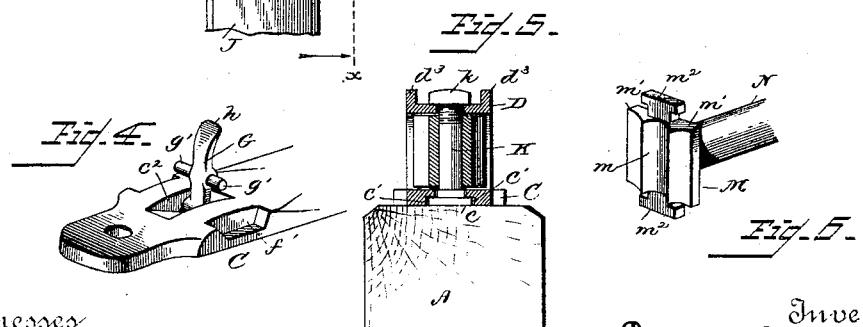
Witnesses
Wm L. Speiden,
Newton B. Lovejoy.
Inventor
Edwd. C. Currey
by W. J. Johnston
Attorney

UNITED STATES PATENT OFFICE.

EDWARD C. CURREY, OF CHICAGO, ILLINOIS.

DRAFT-EQUALIZER.

SPECIFICATION forming part of Letters Patent No. 370,009, dated September 13, 1887.

Application filed January 7, 1887. Serial No. 223,654. (No model.)

*To all whom it may concern:*

Be it known that I, EDWARD C. CURREY, a citizen of the United States, residing at Chicago, in the county of Cook and State of Illinois, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in draft-equalizers for teams, being an improvement on a patent granted to me on the 16th of June, 1885, and numbered 319,961; and its main objects are to provide means whereby the evener-bar may be readily and quickly attached to and detached from the pole or tongue of a vehicle, and to cause the said bar to press against a suitable spring secured to the tongue, whereby sudden shock or jar upon the team is prevented when the vehicle is started or strikes an obstruction, and also to equalize the draft between the animals.

The invention consists, mainly, in the construction and novel arrangement of parts whereby the equalizing-bar is attached to the tongue and the spring is caused to press thereon, and, further, in certain details of construction and arrangement, hereinafter described, illustrated in the drawings, and pointed out in the claims hereto appended.

In the accompanying drawings, Figure 1 represents a perspective view of a tongue or pole of a vehicle with the invention attached thereto. Fig. 2 is a central longitudinal section of the invention so attached. Fig. 3 is a plan view of the same, partly in section, to show the connections of some of the interior parts. Fig. 4 is a detail perspective view of the latch for locking or fastening the bar in place. Fig. 5 is a transverse section on the line $x\ x$ of Fig. 3. Fig. 6 is a detail perspective view of a modification of the bearing-block forming part of the sheath for the pivotal bolt or rod of the equalizing-bar.

Referring to the drawings by letter, A designates a part of the tongue or pole of a vehicle—such as a wagon—that is drawn by horses arranged in pairs, and having whiffletrees attached to the evener.

B is a retaining frame or casing secured at a proper point upon the upper surface of the tongue, near the heel of the same, and composed of a base-plate and upper plate, pivoted at its front end on the base-plate so as to turn laterally thereon, and having a locking block or section pivoted or hinged to the rear end of the upper plate of the frame or casing B.

The base-plate C of the casing is provided at its ends, which are suitably rounded, with openings, by means of which and bolts passing therethrough it is secured to the upper surface of the tongue. The base-plate C, which is preferably of iron, is cast with suitable openings and recesses for the sake of lightness, and is provided about midway with a longitudinal slot, $c$, rabbeted on its edges, so as to form, with the upper surface of the tongue, the similar recesses, $c'\ c'$, on each side of the slot $c$.

$c^2$ is a short longitudinal slot in the base-plate near its rear end, and $c^3$ is a transverse recess which crosses the said slot centrally and is semicircular in cross-section, serving a purpose hereinafter explained.

The upper plate, D, of the casing B has at its forward part the vertical depending projections or side arms, $d\ d$, the lower ends of which enter corresponding slots or recesses in the base-plate when the plate D is in position above and parallel to the base-plate.

$d'$ is a projection or ear standing forward from the lower edge of the closed front end of the plate D, as shown in Figs. 1 and 2. The said projection is provided with an opening, through which the bolt securing the base-plate C to the tongue passes, and the upper plate, D, turns laterally on said bolt as a pivot when released from its locking devices, as hereinafter described. $d^2$ is a longitudinal slot in the plate D, above and about the same length as the slot $c$ in the base-plate. The near ends of the two slots are rounded or semicircular, the said end of the upper slot being vertically above the corresponding end of the lower slot.

$d^3\ d^3$ are upstanding ribs or flanges parallel to and on each side of the edges of the slot $d^2$, the said flanges acting as guides to the nut on the pivoted bolt, which nut rests on the upper surface of the plate D, between the edges of the slot $d^2$ and the flanges.

E is a locking block or section having at its upper and outer corners circular perforated ears, through which passes the pivotal or hinge pin $e$, the portion of which pin between the ears has a bearing in the rounded and perforated rear end, $e'$, of the plate D. The block or section E can thus be turned upward and downward on the plate D. The said block has two similar side plates, F F, each of which is provided on its lower edge with a depending projection, $f$, of suitable shape to enter a corresponding notch, $f'$, made in the adjacent edge of the base-plate, as shown in Fig. 1.

G is a locking bar or latch having on its lower end the lateral trunnions $g$, which rest in bearings having their upper parts formed by the recess $c^3$ and their lower parts by a similar recess formed in the upper surface of the tongue, the latch passing up through the slot $c^2$ in the base-plate.

$g'$ $g'$ are locking pins or projections which stand outward from the opposite edges of the latch G, and when the said latch is turned up ride over the convex tops of the projections $g^2$ $g^2$, which stand inward from corresponding points on the inner surfaces of the side plates, F, of the locking block or section E. The latch, when turned upward and forward, enters a longitudinal notch, $g^3$, made for its accommodation in the floor of the locking-block, as shown in Fig. 2. The end of the latch above the locking-pins $g'$ is curved upward and forward, forming a tongue, $h$, arranged to be engaged by the stirrup or yoke H, Figs. 2 and 3, the ends of which are pivoted upon a transverse bar or rod, $h'$, having its end secured at proper points in the sides of the locking-block, Fig. 3. The said rod is surrounded by the coiled spring I, one end of which bears against the rounded rear end or boss of the plate D and the other end against the transverse bar of the yoke, so as to press the latter downward, Fig. 2. The locking-pins $g'$, when turned upward over the projections $g^2$, hold the locking-block and the plate D in position, and the yoke, when pressed by the spring I downward over the tongue $h$, prevents the locking-bar from moving backward and allowing the block E to become disengaged from the base-plate.

J is the equalizing-bar, which passes between the base and upper plates of the casing B, immediately in front of the locking-block, and has secured upon it at equal distances on each side of the tongue of the vehicle the ordinary hooks to engage the whiffletrees. The said bar has secured centrally upon its front surface a metal plate, $j$, having at equal distances on each side of its center the similar vertical slots, $j'$, which overlie recesses $j^2$, made in the bar.

K is a vertical pivotal bolt which stands normally in the rear ends of the slots $c$ and $d^2$, with its squared head in the recesses $c'$ below the base-plate.

$k$ is a nut on the upper end of said bolt and resting upon the upper surface of the plate D, between the ribs or flanges $d^3$. By means of the nut and the head of the bolt the bolt is always kept in a vertical position, and the upper plate is held in proper position relative to the base-plate should the locking-block become disengaged from the latter.

L is a sleeve surrounding and turning freely on the bolt K, between the base and upper plates, and provided with the similar lateral ears, $l$ $l$, forming a plate on the rear side, each of which ears has near its end a rearwardly-standing pin, $l'$, which enters a corresponding slot $j'$ and recess $j^2$, respectively, in the plate $j$ and in the equalizing-bar, as described. The equalizing-bar is held in position within the casing by the described attachment, and at the same time can vibrate freely upon the pivotal bolt in a horizontal direction. It has also a slight vertical vibration, as it is somewhat narrower than the distance between the plates of the casing, and as the pins $l$ do not fill the whole space of the slots $j'$ and recesses $j^2$. Thus on a hillside the equalizing-bar will not bind in the casing.

M is a bearing-block having a vertical semicircular groove, $m$, on its rear surface, as shown in Fig. 6, within which groove the front side of the pivotal bolt K rests, and N is a rod or shank extending horizontally forward from the front surface of said block. The ends of the bearing-block enter, respectively, the slots $c$ and $d^2$, the shoulders $m'$ $m'$ near said ends resting against the inner surfaces of the upper and lower plates of the casing, so as to keep the bearing-block in proper position. O is a coiled spring surrounding and kept in place by said rod, and bearing at its rear end against the front side of the block M, and at its front end against the inner surface of the closed front end of the casing B, as shown in Fig. 2. It is evident that when the draft comes upon the equalizing-bar the spring will be compressed, and the bar, the pivotal pin, and bearing-block will move forward. Now, in suddenly starting or increasing or decreasing the speed of the vehicle this freedom of motion of the described parts will largely prevent jar, and possibly breakage of parts of the wagon or of the harness, such as the traces.

The action of the equalizing-bar is well understood and needs no detailed description, the simple and effective construction of the bar being the point to which attention is called.

Fig. 6 shows a modification of the bearing-block M. In said modification the upper and lower ends of the block are provided with lateral extensions $m^2$ $m^2$, which respectively rest above the top plate and below the base-plate. When this modification is used, the pivotal bolt K may be dispensed with and the sleeve L made solid and trunnioned at its ends. The block M then performs the function of holding the top and base plates together.

Having thus described my invention, what I claim as new, and desire to secure by Letters Patent, is—

1. In a draft-equalizer, the combination of the casing secured to the tongue of a vehicle, and having corresponding longitudinal slots in its upper and lower plates, the coiled spring within the casing, the vibrating or oscillating plate pressed rearward by said spring, and the equalizing-bar attached to and moving with said plate, all constructed and arranged substantially as and for the purpose specified.

2. In a draft-equalizer secured to the tongue of a vehicle and provided with the corresponding longitudinal slots in its upper and lower plates, the longitudinal coiled spring within the casing, the bearing-block provided with a vertical groove on its rear surface semicircular in cross-section and on its front surface with a retaining rod or shank extending within the coiled spring, the oscillating plate bearing at its center against said block, and the equalizing-bar attached to and moving with said plate, all constructed and arranged substantially as and for the purpose specified.

3. In a draft-equalizer, the combination, with the casing, coiled spring, and bearing-block, all constructed substantially as described, of the oscillating plate bearing against the said block and provided near its ends with the similar rearward-extending engaging pins or studs, the equalizing-bar provided with the recesses at equal distances from its center, and the plate secured to the front surface of said bar and provided with the vertical slots overlying the recesses in the equalizing-bar and engaging the pins on the oscillating plate, so that the equalizing-bar can have a vertical vibration on said plate, substantially as specified.

4. In a draft-equalizer, the combination, with the equalizing-bar, the locking-block, and mechanism to hold the equalizing-bar in place, all constructed and arranged substantially as described, of the casing composed of a base-plate secured to the tongue of a vehicle and a top plate pivoted at its front end on said base-plate, so that it can be turned laterally thereon for the purpose of easily removing the equalizing-bar and adjacent parts, substantially as specified.

5. In a draft-equalizer, the combination, with the casing constructed substantially as described, and the locking block or section, pivoted or hinged to the rear end of the top plate of said casing and provided on the inner surfaces of its sides with the inwardly-standing projections, of the latch provided at its lower end with trunnions having bearings in proper recesses in the base-plate of the casing, and having at suitable points on its edges locking studs or pins, which engage over the projections on the locking-block when the latch is turned forward, substantially as specified.

6. In a draft-equalizer, the combination, with the casing and locking-block constructed substantially as described, of the hinged or pivoted latch having its upper end formed into a tongue, the yoke attached to and vibrating on a transverse bar running from side to side of the locking-bar and arranged to press the yoke over the tongue of the latch, so as to prevent the latter from moving backward, substantially as specified.

7. In a draft-equalizer, the combination, with the slotted casing, equalizing-bar, bearing-block, and coiled spring, all constructed substantially as described, of the pivotal bolt, the sleeve surrounding said bolt, and the plate made integral with said sleeve and engaged to the equalizing-bar, substantially as specified.

8. In a draft-equalizer, the combination, with the casing having its upper plate provided with a longitudinal slot and its lower or base plate provided with a corresponding slot, rabbeted on the edges of its lower surfaces to form recesses with the upper surface of the tongue of a vehicle to which the casing is secured, of the pivotal bolt, with the edges of its head resting in said recesses, and the nut on the upper end of the bolt and resting on the upper surface of the top plate of the casing, substantially as specified.

9. In a draft-equalizer, the combination, with the casing secured to the tongue of a vehicle, having a longitudinal slot in its upper plate and a corresponding slot in its lower or base plate, which slot is rabbeted on the edges of its under surface, so as to form side recesses with the upper surface of the tongue of the vehicle, of the pivotal bolt, with the edges of its head resting and sliding in said recesses, the nut on the upper end of the bolt and resting on the outer surface of the upper plate of the casing, the sleeve surrounding said bolt, the plate made integral with the sleeve and engaged, as described, to the equalizing-bar, and the bearing-block and coiled spring, all constructed and arranged substantially as and for the purpose specified.

10. The herein-described draft-equalizer, composed of the casing B, having the upper and lower plates, C and D, slotted longitudinally, as described, the locking-block E, hinged or pivoted to the rear end of the said upper plate, the latch G, the spring-controlled yoke H, the equalizing-bar J and plate $j$, secured thereto, the pivotal bolt K and nut $k$, the sleeve L and ears $l\,l$, made integral therewith and engaged to the equalizing-bar, the bearing-block M, provided with the rod or shank N, and the coiled spring O, all constructed and arranged substantially as and for the purpose specified.

In testimony whereof I affix my signature in presence of two witnesses.

EDWARD C. CURREY.

Witnesses:
D. J. MOREY,
J. H. BROCK.